United States Patent [19]
Uhler et al.

[11] Patent Number: 5,845,075
[45] Date of Patent: Dec. 1, 1998

[54] METHOD AND APPARATUS FOR DYNAMICALLY ADDING FUNCTIONALITY TO A SET OF INSTRUCTIONS FOR PROCESSING A WEB DOCUMENT BASED ON INFORMATION CONTAINED IN THE WEB DOCUMENT

[75] Inventors: Steve Uhler, Los Altos; Brent B. Welch, Mountain View, both of Calif.

[73] Assignee: Sun Microsystems, Inc., Mountain View, Calif.

[21] Appl. No.: 673,956

[22] Filed: Jul. 1, 1996

[51] Int. Cl.$^6$ .................................................. G06F 17/30
[52] U.S. Cl. ............................. 395/200.3; 395/200.33; 395/200.48; 707/10; 707/500; 707/513
[58] Field of Search ..................................... 395/200, 500, 395/793, 762, 774, 200.3–200.33, 200.36, 200.48, 200.49, 200.57, 200.68, 680–685; 380/4, 9, 49; 707/513, 500, 10

[56] References Cited

U.S. PATENT DOCUMENTS

| | | | |
|---|---|---|---|
| 5,530,852 | 6/1996 | Meske, Jr. et al. | 395/200.36 |
| 5,572,643 | 11/1996 | Judson | 395/200.48 |
| 5,706,502 | 1/1998 | Foley et al. | 395/682 |
| 5,706,507 | 1/1998 | Schloss | 395/615 |
| 5,708,709 | 1/1998 | Rose | 380/4 |
| 5,710,918 | 1/1998 | Lagarde et al. | 395/680 |
| 5,745,909 | 4/1998 | Perlman et al. | 707/513 |
| 5,764,916 | 6/1998 | Busey et al. | 395/200.57 |

OTHER PUBLICATIONS

Maria M. Larrondo–Petrie et al, "A Domain Analysis of Web Browser Architectures Language and Features", IEEE Southcon/96 Conference Record, pp. 168–174, Jun. 1996.

Stuart goose et al, "An Open Framework for Integrating Widely Distributed Hyper Media Resources", IEEE Multimedia Computing and System, 1996 Int'l. Conference, pp. 364–371, Jun. 1996.

Kin–Man Chung and Herbert Yuen, "A 'Tiny' Pascal Compiler: Part 1: the P–Code Interpreter," BYTE Publications, Inc., Sep. 1978, pp. 59–65 and 148–155.

Kin–Man Chung and Herbert Yuen, "A 'Tiny' Pascal Compiler: Part 2: The P–Compiler," BYTE Publications, Inc., Oct. 1978, pp. 34–52 (even pages only).

Ken Thompson, Regular Expression Search Algorithm, Communications of the ACM, vol. II, No. 6, Jun. 1968 at 419 et seq., pp. 419–422.

James G. Mitchell, William Maybury and Richard Sweet, Mesa Language Manual, a Xerox Corporation Document.

Gene McDaniel, An Analysis of a Mesa Instruction Set, a Xerox Corporation Document.

Kenneth A. Pier, A Retrospective on the Dorado, A High– Performance Personal Computer, a Xerox Corporation document.

Kenneth A. Pier, A Retrospective on the Dorado, A High– Performance Personal Computer, a Xerox Corporation document, pp. 252–269.

R.L. Johnston, Association for Computing Machinery, The Incremental Compiler of APL/3000, May–Jun. 1979, pp. 83–87.

Fifth Annual ACM Symposium, Principles of Programming Languages, Jan. 1978, pp. iii, 3–6.

Krasner, Glenn, The Smalltalk–80 Virtual Machine, BYTE Publications Inc., Aug. 1991, pp. 300–320.

Primary Examiner—Parshotam S. Lall
Assistant Examiner—Bharat Barot
Attorney, Agent, or Firm—Blakely Sokoloff Taylor & Zafman

[57] ABSTRACT

A method for dynamically adding new functionality to a first set of instructions that processes Web documents. The invention includes the first step of the first set of instructions decoding a first statement of the Web document. The first statement includes a first command and at least one instruction provided as an argument to the first command. In response to executing the first command, the first set of instructions decodes the instruction provided as the argument to the first command and issues the instruction to be executed. Executing the instruction provided as an argument to the first command, results in new Web document processing functionality being added to the first set of instructions.

34 Claims, 2 Drawing Sheets

METHOD AND APPARATUS FOR DYNAMICALLY ADDING FUNCTIONALITY TO A SET OF INSTRUCTIONS FOR PROCESSING A WEB DOCUMENT BASED ON INFORMATION CONTAINED IN THE WEB DOCUMENT

FIELD OF THE INVENTION

The present invention relates to data processing in computer systems, and in particular, dynamically adding functionality to a Web browser from a Web document.

BACKGROUND OF THE INVENTION

Networking technology has developed a large network of networks, referred to as the Internet, which interconnects millions of computers around the world. The Internet allows the transfer of data between any number of computer systems connected to the Internet using the Transmission Control Protocol/Internet Protocol (TCP/IP). Computers responding to service requests from other computers, via the Internet, are commonly referred to as servers, and computers that initiate requests for service from a server are referred to as clients.

The Internet has become very popular in part due to the World Wide Web (WWW), which is a network of links to hypertext documents operating within the Internet. These hypertext documents are referred to as either Web documents, Web pages, or hypertext documents. Web documents are embedded with directly accessible connections or links to other documents which create a non-linear way of reading the document. The links are embedded in Web documents as a phrase of text or an image which can be selected and activated by a computer user. Information about the Web documents are controlled and provided by Web servers. At the user's end, a Web client takes the user's requests and passes them on to the Web server.

The Web documents are written with a high level programming language referred to as the Hypertext Markup Language (HTML). Commands of the HTML, hereinafter referred to as tags, provide a variety of functions including, but not limited to, defining special format and layout information in a Web document, embedding images and sound in a Web document, and embedding links to other Web documents.

In order to access, process, and display a Web document, a client uses a first set of instructions, referred to as a browser. The browser typically includes a set of browser commands corresponding to the tags available in the HTML. Each browser command in turn points to a procedure of one or more instructions defining the command which, when executed, provide a functionality of the respective command. If the client requires service from the Web server, the browser uses the Hypertext Transfer Protocol (HTTP) to communicate with the server.

The browser compares each tag found embedded in a Web document with the set of browser commands. Once a match is found, the browser executes the procedure corresponding to the matched browser command in order to provide the functionality of the respective command.

The instructions of the browsers are typically written with a programming language different from the HTML, which includes a library of several routines. The library of routines can in turn be used to develop and add new browser commands, or modify existing browser commands, which can be embedded in a Web document as new or modified tags to provide new functionality when displaying the Web document.

The need for new browser commands, or to modify an existing browser command, is typically recognized (at the site of the server) when writing a Web document. For example, a programmer writing a Web document may want to use a new tag to display selected text on a Web document in color. However, before the new command can be embedded in a Web document as a new tag and properly executed, a browser command corresponding to the new tag must first be defined and implemented on the client's browser which is going to access and display the Web document.

Conventionally, instructions defining new browser commands, or modifying existing browser commands, are manually added to the browser by the client when the browser is not in use (i.e., offline). However, this procedure is inefficient because the client must take the time to manually add the new instructions every time a new command, or modified existing command, is to be added to the browser, regardless of whether the new or modified command will be used in other Web documents. Moreover, the procedure is impractical because the client may not have access to the instructions defining the new or modified command, and usually doesn't know when it is necessary to add instructions to define new or modify existing commands.

It is also impractical for a server to add the instructions to a client's browser because servers are generally unaware of which potential clients are going to access their Web documents. Moreover, a server rarely has access privileges to enter a client's browser and add additional instructions.

SUMMARY OF THE INVENTION

One embodiment of the invention provides a method for dynamically adding new functionality to a first set of instructions that processes Web documents. The invention includes the first step of the first set of instructions decoding a first statement of the Web document. The first statement includes a first command and at least one instruction provided as an argument to the first command. In response to executing the first command, the first set of instructions decodes the instruction provided as the argument to the first command and issues the instruction to be executed. Executing the instruction provided as an argument to the first command, results in new Web document processing functionality being added to the first set of instructions.

BRIEF DESCRIPTION OF THE DRAWINGS

One embodiment of the invention is illustrated by way of example and not limitation in the figures of the accompanying drawings, in which like references indicate similar elements, and in which.

DETAILED DESCRIPTION

One embodiment of the invention provides a method and apparatus for dynamically adding or modifying functionality of a Web browser. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
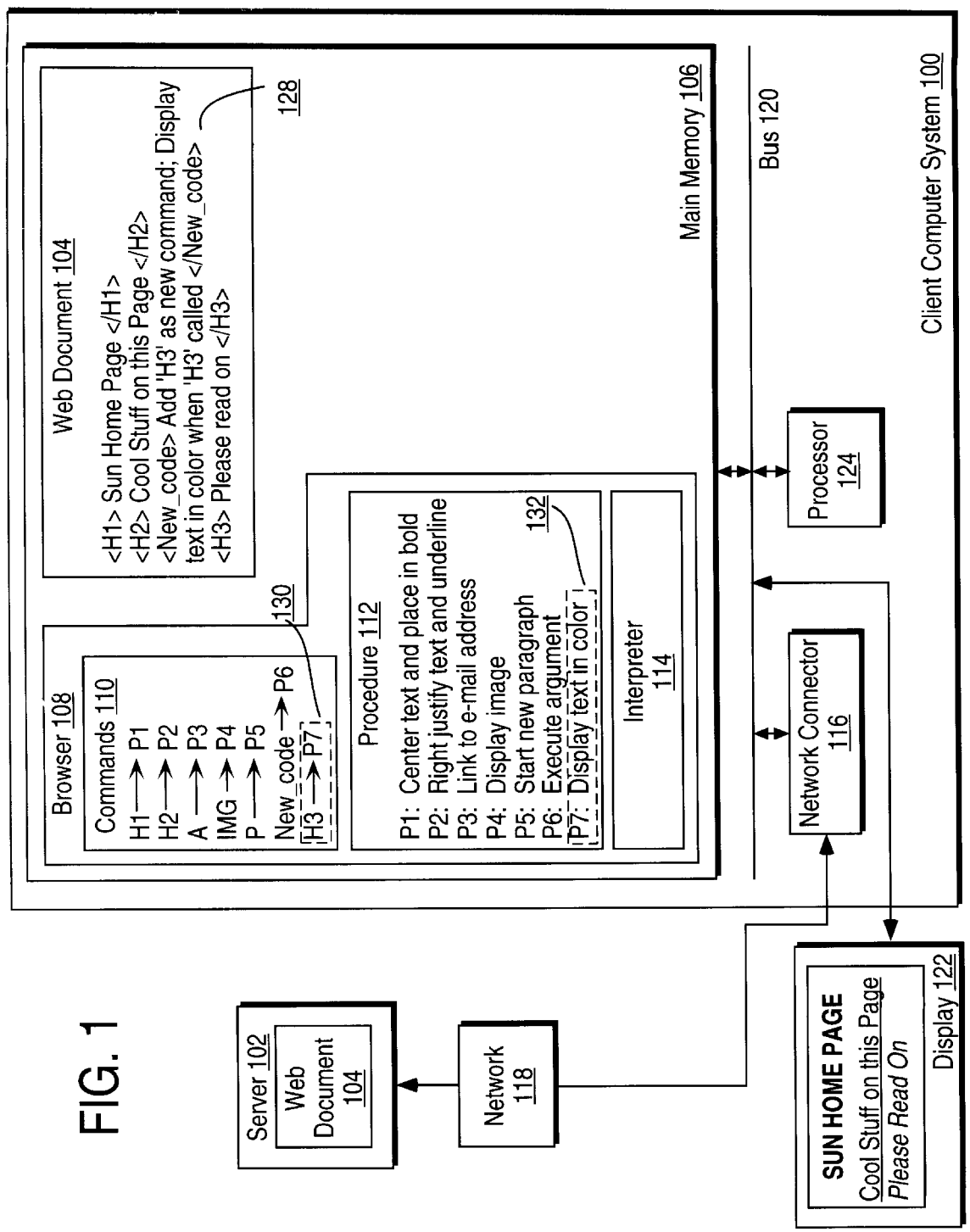
FIG. 1 illustrates a computer system, connected to a server, wherein the computer system is capable of dynamically adding or modifying instructions in a Web browser, according to one embodiment of the invention.

FIG. 1 illustrates a block diagram of a computer system 100 capable of adding functionality to a Web browser 108 from a Web document 104 when the Web browser 108 is processing the Web document 104, according to one embodiment of the invention. The computer system 100 includes a Web browser 108 stored in main memory 106 for accessing and processing the Web document 104 provided by a server 102. The computer system 100 further includes a processor 124 and a network connector 116 coupled to a bus 120. The network connector 116 is further coupled to a network 118.

In one embodiment of the present invention, the browser 108 is written in the Tool Command Language (Tcl) programming language, which is an interpreted language (i.e. each statement of code is decoded and executed before the next line of code). In alternative embodiments, the browser may be written in other interpreted languages that allow extension of applications.

As illustrated in FIG. 1, computer system 100 is shown accessing, interpreting, and displaying a Web document 104 provided by the server 102. After the Web document 104 is transferred from the server 102 to the main memory 106 of client 100, the Web document 104 is interpreted by the client 100.

In the example shown in FIG. 1, the content of sample Web document 104 is illustrated within main memory 106 as including instructions to be added to the Web browser 108, which define a new browser command (i.e. the argument to the <New_Code> 128 command) to be added to the browser's 108 set of browser commands 110. The interpreted Web document 104 is in turn shown on display 122, displaying the functionality of the new browser command. The novel way in which the present invention enables this dynamic modification of a browser is described in detail in the following sections.

Figure 2:
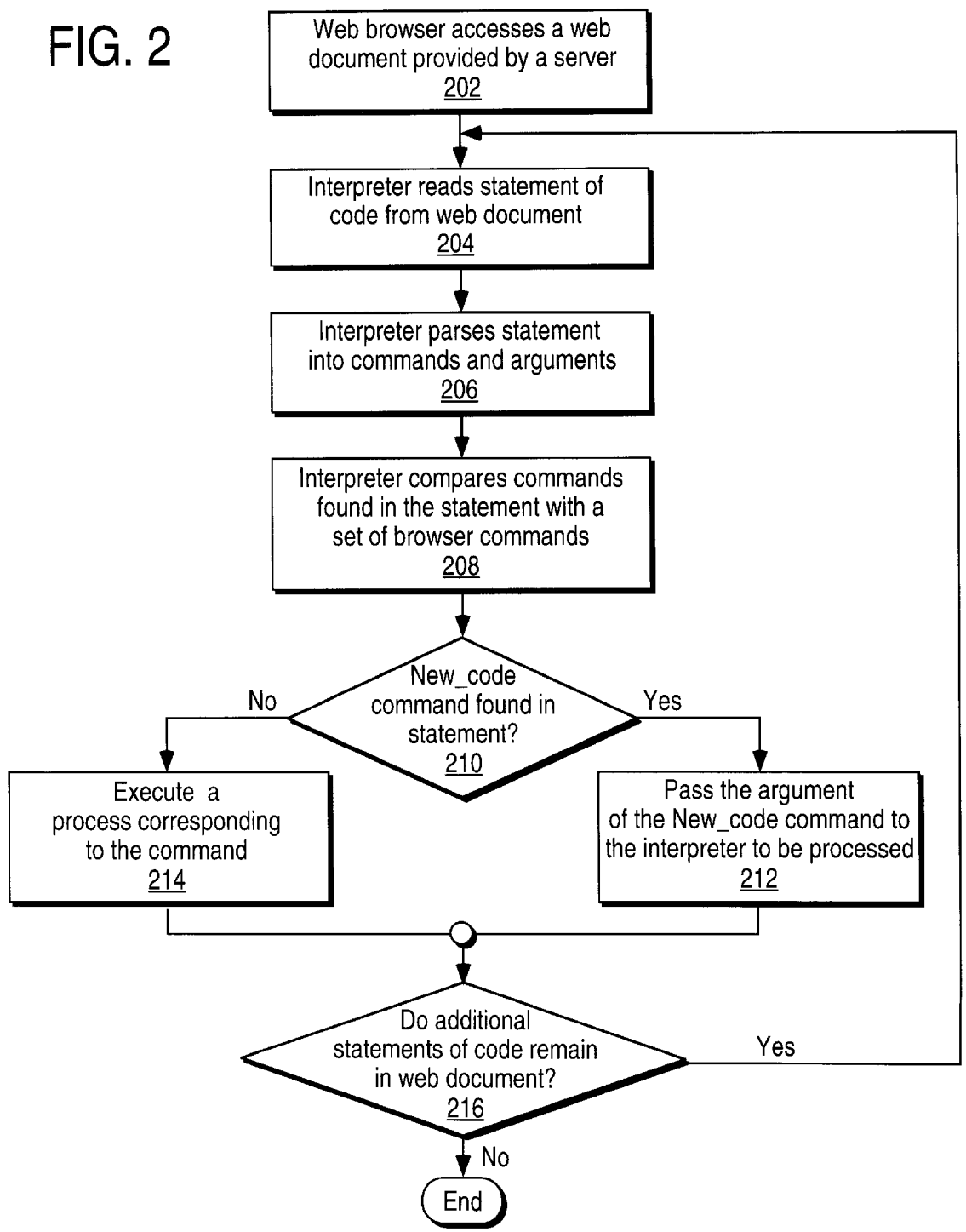
FIG. 2 illustrates a flow diagram illustrating the steps of adding instructions to a Web browser from a Web document when the Web browser is interpreting the Web document, according to one embodiment of the invention.

FIG. 2 illustrates a flow diagram of the steps performed in order to add functionality to a Web browser from a Web document when the Web browser is processing the Web document, according to one embodiment of the present invention. In block 202, the browser 108 stored in computer system 100 accesses a Web document 104 provided by the server 102. In block 204, the interpreter 114 of the browser 108 reads a single statement of code provided in the Web document 104. In block 206, the interpreter 114 parses the statement into tags and arguments.

In block 208, the interpreter 114 compares any tags found in the statement with the set of browser commands 110 provided in the browser 108. In one embodiment of the invention, the set of browser commands 110 includes a command, hereinafter referred to as the "New_" command, which accepts additional instructions as its argument. When executed, the New_command causes the instructions provided as its argument to be passed to the interpreter 114, wherein the instructions are parsed and executed. In one embodiment of the invention, the New_command is generated in part using the conventional "eval" command of the Tcl programming language.

In decision block 210, it is determined whether the statement of code read from the Web document includes the New_command. If the New_command is included in the statement, then in block 212, the instructions provided as the argument to the New_command are passed to the interpreter 114, where they are parsed and executed as previously described.

In one embodiment of the invention, the instructions provided as the argument to the New_command may define a new command or modify an existing browser command. The new command, or modified existing command, may provide new functionality to the browser, which typically includes, but is not limited to, modifying an appearance of a Web document, embedding multimedia data in a Web document, and/or embedding in a Web document a link to a separate discrete unit of information.

The instructions provided as the argument to the New_command are encoded using the library of routines belonging to the conventional programming language used to write the Web browser 108. The new or modified browser commands may correspond to new HTML tags, which may be used to modify the appearance of a Web document, define special formats and layout information of a Web document, embed images and sound in a Web document, or embed links to other Web documents.

The new or modified existing browser commands may be enforced for the duration the present Web document is displayed, or optionally, enforced for the life of the browser 108. The instructions provided as an argument to a New_command may also be used to replace the client's existing browser with a new browser.

In an alternative embodiment, the instructions provided as the argument to the New_command may include a Uniform Resource Locator (URL), which provides an address to a separate Web document having instructions that define a new command or modify an existing browser command. The instructions may be downloaded to the client from the separate document and processed as described in block 212.

FIG. 1 illustrates an example of using the New_command to add a new command to the browser. As illustrated, the third statement in the Web document 104, shown stored in the main memory 106, includes a New_command 128 followed by the instructions to add a new browser command, "H3", which when executed will cause selected text to be displayed in color.

In response to executing the New_command, the interpreter adds the command H3 130 to the set of browser commands 110, and further adds the definition 132 of H3 to the set of procedures 112. The H3 command is then used as a tag in the next statement of the same Web document to have selected text of the Web document displayed in color, as indicated on display 122.

In addition, in FIG. 1, the Browser 108, which includes the Interpreter 114, the Procedures 112, the Commands 110, could alternatively be stored on another computer-readable medium, including magnetic and optical disk, which could be accessed via a disk drive coupled to the client's computer system.

In decision block 210, if it is determined that the command embedded in the statement being interpreted is not a New_command, then in block 214, the interpreter 114 executes the procedure corresponding to the command in order to provide the functionality of the command.

In decision block 216, it is determined whether additional statements remain to be processed in the Web document 104. If no statements remain to be processed, the Web document remains displayed until a user of the computer system 100 exits the Web document using conventional means. On the other hand, if statements remain to be processed, the remaining statements are sequentially processed in steps similar to those described in blocks 204–216, wherein the individual statements are parsed and executed in order to provide the functionality of each command embedded in the statement.

The apparatus and method of the present invention for dynamically adding or modifying functionality of a browser from a Web document when the browser is interpreting the Web document provides many advantages. For example, servers can provide Web documents using new tags and the browser commands corresponding to the new tags without regard to the commands available on a client's browser and be assured that the tags will be executed as defined by the server.

The present invention also allows the browser commands corresponding to the new tags to be transparently added to the client's browser. As a result, the client does not have to know when, or how, a new or modified command is to be defined on their browser.

In addition, the present invention can also be used to conserve memory space, which may be critical on a limited resource set top box. For example, a new or modified existing browser command may only be applicable to a new tag being used in the present Web document. In such a case, the functionality to be added to a Web browser can be defined to only remain on the browser for the duration of the present Web document's display.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense. Moreover, the following claims indicate the scope of the invention, and all variations which come within the meaning and range of equivalency of the claims are to be embraced within their scope.

What is claimed is:

1. A computer implemented method for adding functionality to a first set of instructions provided for processing a Web document, said method comprising the steps of:

executing said first set of instructions to process said Web document;

said first set of instructions decoding a first statement provided by said Web document, said first statement including a first command and at least one instruction provided as an argument to said first command;

said first set of instructions issuing said first command provided by said Web document to be executed;

in response to an execution of said first command, said first set of instructions decoding said one instruction provided as said argument to said command and issuing said one instruction to be executed; and providing new Web document processing functionality to said first set of instructions upon execution of said one instruction provided by said first statement of said Web document.

2. The computer-implemented method of claim 1, wherein the first set of instructions is a Web browser and said statement of said Web document is generated in a Hypertext Markup Language (HTML).

3. The computer-implemented method of claim 1, further including the step of:

prior to said step of decoding said first statement, retrieving, via a network connection, said Web document from a separate computer system.

4. The computer-implemented method of claim 3, wherein said first set of instructions includes a set of commands, wherein each command provides a separate functionality selected from a group of functionalities consisting of modifying an appearance of said Web document, embedding multimedia data in said Web document, and embedding in said Web document a link to a separate discrete unit of information.

5. The computer-implemented method of claim 4, wherein said set of commands are HTML commands.

6. The computer-implemented method of claim 4, wherein in further response to said execution of said one instruction provided as said argument to said first command, adding a new command to said set of commands, said new command having a functionality selected from said group of functionalities.

7. The computer-implemented method of claim 6, further comprising the steps of:

said first set of instructions decoding a second statement of said Web document, said second statement including said new command;

said first set of instructions issuing said new command to be executed;

in response to an execution of said new command, invoking said functionality of said new command during a processing of said Web document.

8. The computer-implemented method of claim 4, wherein in further response to said execution of said one instruction provided as said argument to said first command, modifying a functionality of an existing command in said set of commands.

9. The computer-implemented method of claim 8, further comprising the steps of:

said first set of instructions decoding a third statement of said hypertext document, said third statement including said existing command;

said first set of instructions issuing said existing command to be executed;

in response to an execution of said existing command, invoking said functionality of said existing command, as modified, during a processing of said hypertext document.

10. A computer-implemented method for enabling a target computer system to add functionality to a first set of instructions during an execution of said first set of instructions, said first set of instructions capable of processing a hypertext document having a collection of discrete units of information, wherein each discrete unit is capable of including a link to a separate discrete unit of information, by transmitting a sequence of instructions from a host computer system which, when executed, cause said target computer system to perform the method recited in any one of the claims 7 or 9.

11. A computer-readable medium having stored thereon a first set of instructions, said first set of instructions provided for processing a Web document, said first set of instructions, which, when executed by a processor, cause said processor to perform the steps of:

decoding by said first set of instructions a first statement provided by said Web document, said first statement including a first command and at least one instruction provided as an argument to said first command;

issuing by said first set of instructions said first command provided by said Web document to be executed;

in response to an execution of said first command, decoding by said first set of instructions said one instruction provided as said argument to said command and issuing said one instruction to be executed; and providing new Web document processing functionality to said first set of instructions upon execution of said one instruction provided by said first statement of said Web document.

12. The computer-readable medium of claim 11, wherein the first set of instructions is a Web browser and said statement of said Web document is generated in a Hypertext Markup Language (HTML).

13. The computer readable medium of claim 11, containing additional instructions in said first set of instructions which, when executed by said processor, cause said processor to perform the steps of:

prior to said step of decoding said first statement, retrieving, via a network connection, said Web document from a separate computer system.

14. The computer-readable medium of claim 13, wherein said first set of instructions includes a set of commands, wherein each command provides a separate functionality selected from a group of functionalities consisting of modifying an appearance of said Web document, embedding multimedia data in said Web document, and embedding in said Web document a link to a separate discrete unit of information.

15. The computer-readable medium of claim 14, wherein said set of commands are HTML commands.

16. The computer-readable medium of claim 14, wherein in further response to said execution of said one instruction provided as said argument to said first command, adding a new command to said set of commands, said new command having a functionality selected from said group of functionalities.

17. The computer-readable medium of claim 16, containing additional instructions in said first set of instructions which, when executed by a processor, cause said processor to perform the steps of:

decoding by said first set of instructions a second statement of said Web document, said second statement including said new command;

issuing by said first set of instructions said new command to be executed;

in response to an execution of said new command, invoking said functionality of said new command during a processing of said Web document.

18. The computer-readable medium of claim 14, wherein in further response to said execution of said one instruction provided as said argument to said first command, modifying a functionality of an existing command in said set of commands.

19. The computer-readable medium of claim 18, containing additional instructions in said first set of instructions which, when executed by a processor, cause said processor to perform the steps of:

said first set of instructions decoding a third statement of said Web document, said third statement including said existing command;

said first set of instructions issuing said existing command to be executed;

in response to an execution of said existing command, invoking said functionality of said existing command, as modified, during a processing of said Web document.

20. A computer system comprising of:

a first mechanism to process a Web document, said first mechanism operable to decode a first statement provided by said Web document, said first statement including a first command and at least one instruction provided as an argument to said first command;

said first mechanism operable to issue said first command provided by said Web document to a processor to be executed; and said first mechanism operable to decode, in response to an execution of said first command, said one instruction provided as said argument to said command and issue said one instruction to be executed, wherein execution of said one instruction provides new Web document processing functionality to said first mechanism.

21. The computer system of claim 20, wherein the first statement of the Web document is generated in a Hypertext Markup Language (HTML).

22. The computer system of claim 20, further comprising:

a second mechanism configured to retrieve, via a network connection, said Web document from a separate computer system.

23. The computer system of claim 22, wherein said first mechanism includes a set of commands, wherein each command provides a separate functionality selected from a group of functionalities consisting of modifying an appearance of said Web document, embedding multimedia data in said Web document, and embedding in said Web document a link to a separate discrete unit of information.

24. The computer system of claim 23, wherein said set of commands are HTML commands.

25. The computer system of claim 23, wherein said first mechanism is further configured to add, in response to said execution of said one instruction provided as said argument to said first command, a new command to said set of commands, said new command having a functionality selected from said group of functionalities.

26. The computer system of claim 25, wherein said first mechanism is further configured to decode a second statement of said Web document, said second statement including said new command, said first mechanism configured to issue said new command to be executed, and said first mechanism is further configured to invoke, in response to an execution of said new command, said functionality of said new command during a processing of said Web document.

27. The computer system of claim 23, said first mechanism further configured to modify, in response to an execution of said one instruction provided as said argument to said first command, a functionality of an existing command in said set of commands.

28. The computer system of claim 27, wherein said first mechanism is further configured to decode a third statement of said Web document, said third statement including said existing command, said first mechanism configured to issue said existing command to be executed, and said first mechanism further configured to invoke, in response to an execution of said existing command, said functionality of said existing command, as modified, during a processing of said Web document.

29. A machine-implemented method comprising the steps of:

receiving a Web document, the Web document providing information indicating a new functionality for processing the Web document;

executing a set of instructions to process the document, the set of instructions including a set of one or more commands that provide functionality for processing the Web document;

the set of instructions processing the information provided by the Web document, which information indicates the new functionality for processing the Web document; and in response to processing the information provided by the Web document for indicating the new functionality for processing the Web document, altering the set of one or more commands of the set of instructions to include a new command for providing the new functionality to the set of instructions for processing the Web document.

30. The method of claim 29, wherein the set of instructions comprises a Web browser.

31. The method of claim 30, wherein at least a portion of the Web document is generated in a Hypertext Markup Language (HTML).

32. The method of claim 29, further comprising the steps of:

decoding a first statement contained in the information, the first statement including the new command and at least one instruction provided as an argument to the new command;

the set of instructions issuing the new command to be executed; and in response to execution of the new command, the set of instructions decoding the at least one instruction provided as an argument to the new command and issuing the one instruction to be executed to add the new functionality to the set of instructions for processing the Web document.

33. The method of claim 32, wherein the the set of instructions comprises a Web browser.

34. The method of claim 29, wherein the new command represents a modified one or more of the set of commands.

* * * * *